United States Patent Office 3,367,978
Patented Feb. 6, 1968

1

3,367,978
4-(PHENOXY)PHENOLS
Dwain M. White, Schenectady, N.Y., assignor to General
Electric Company, a corporation of New York
No Drawing. Filed May 3, 1966, Ser. No. 547,182
5 Claims. (Cl. 260—613)

This invention relates to novel phenoxyphenols. More specifically, this invention relates to phenoxyphenols having the formula:

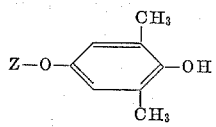

where Z is

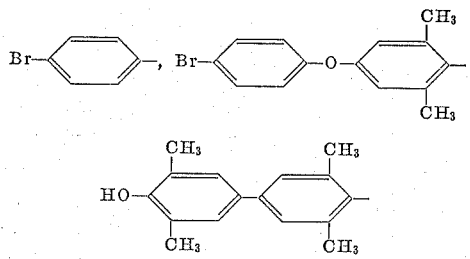

and

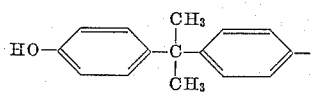

Low molecular weight poly-(1,4-phenylene ethers) having from 2 to about 8 repeating units in the polymer molecule, have been prepared by the Ullmann reaction which involves first converting the phenol to an ether such as the methyl ether, followed by halogenation of the p-position and thereafter reacting the p-halophenylmethyl ether with an alkali metal salt of the phenol in the presence of copper metal as a catalyst. This initial reaction leads to the formation of a 4-(phenoxymethyl ether). For each additional unit added in the polymer chain, it is necessary to demethylate the ether to form the free phenol and then convert it to an alkali metal salt, followed by reaction with an additional amount of the 4-(halophenylmethyl ether). This reaction cannot be used for the making of 4-(phenoxy)-phenols having either hydroxyls or halogen in the p-position of the terminal phenoxy group.

In the Cooper and Gilbert application Ser. No. 547,180, filed concurrently herewith and assigned to the same assignee as the present invention, there is disclosed and claimed a novel method for the equilibration of poly-(1,4-phenylene) ethers. I have discovered that this process is capable of producing certain new and novel phenoxyphenols. Specifically, the phenols covered by the above general formula.

Phenoxyphenols in which the phenoxy group is substituted in the para position of the phenol nucleus and especially those in which the two ortho positions of each benzene nucleus, i.e., the 2- and 6- position of each benzene nucleus, are substituted with halogen or methyl groups,

2 have been of interest for a long period of time as starting materials for the production of thyroxine analogs; see for example, Bielig and Lützel, Ann., 608, 140 (1957), and Van Heyningen, J. Org. Chem., 26, 3850 (1961). These authors brominated various 2,2',6,6'-tetrasubstituted phenoxyphenols and assumed that the bromination occurred in the para position of the phenoxy group, but they did not definitely prove the structure of their resulting product. Their assumption was apparently based on the fact that bromination of the unsubstituted para position of phenols and phenol ethers occurs when such compounds have substituents in both ortho positions, but it overlooks the fact that the meta position can be brominated when there are substituents in the para and both ortho positions of such compounds.

In a copending application of Hamilton and Blanchard, Ser. No. 386,699, filed July 31, 1964, and assigned to the same assignee as the present invention, there is disclosed and claimed the compound 4-(4-bromo-2,6-dimethylphenoxy)-2,6-dimethylphenol and a method of making the same. However, the process disclosed therein is not capable of making 4-(4-bromophenoxy)-2,6-dimethylphenol, since it would not be possible to limit the bromination to only the p-position. Insofar as I am aware, there is no disclosed method of making the dihydric phenoxyphenols included in the above general formula. These dihydric phenols are particularly desirable for the making of polyesters, polycarbonates, polyurethanes, etc.

The reaction by which I prepare these compounds involves the equilibration of poly-(2,6-dimethyl-1,4-phenylene ether) with 4-bromophenol, 2,2',6,6'-tetramethyl-p-p'-biphenol or 4,4'-isopropylidenediphenol. This reaction between the phenol and the poly-(2,6-dimethyl-1,4-phenylene ether) is carried out in solution with the reaction being initiated by a phenoxy radical of the phenol, the polymer or both the phenol and the polymer. During the equilibration reaction, both the aryloxy radical of the phenol and the polyphenylene ether are formed as transient intermediates in what is believed to be a free radical reaction. The solvent should be one in which both the reactants and the products are soluble and which will be inert under the reaction conditions. Liquid aromatic hydrocarbons are ideally suited as solvents for the reaction, for example, benzene, toluene, xylene, etc.

The phenoxy radicals are created in various ways. They may be generated by adding a stable free radical to the solution which reacts with the phenol or polyphenylene ether to create the phenoxy radicals or the phenoxy radicals may be generated in situ by use of an oxidizing agent capable of creating the phenoxy radicals or the phenoxy radicals may be created by exposure to the reaction mixture to actinic radiation in the presence of oxygen.

The reaction proceeds at ambient room temperature conditions, but is hastened by heating so that temperatures up to the reflux temperature of the reaction mixture may be used. Generally, no advantage is gained by the use of sub-atmospheric or super atmospheric pressure, but may be used if desired.

Typical examples of free radicals which may be used to initiate the equilibration reaction between the phenol and polyphenol ether are: tri-t-butylphenoxyl diphenylpicrylhydrazyl, the free radical known as galvanoxyl, which is 2,6-di-t-butyl-α-(3,5-di-t-butyl-4-oxo-2,5 - cyclohexadiene-1-ylidene)-p-tolyloxy, triphenylimidazyl, tetraphenylpyrryl, etc. These free radicals are highly colored, but when they are added to the reaction mixture of the phenol and polyphenylene ether, the color is immediately discharged due to the formation of the desired phenoxy radical. The above free radicals are extremely easy to prepare and therefore, readily available. For example, the stable 2,4,6-tri-t-butylphenoxy free radical is readily prepared by treating a solution of 2,4,6-tri-t-butylphenol in an inert hydrocarbon solvent with an oxidizing agent such as peroxide, potassium ferricyanide, etc. This radical is extremely stable and can be kept for long periods of time in solution or can actually be isolated as a solid. However, it should be kept out of contact with oxygen. One means of stabilizing solutions of this free radical is to add a phenol such as 4-t-butylphenol which reacts with the free radical to produce 4-(4-t-butylphenoxy)-2,4,6-tri-t-butyl-2,5-cyclohexadienone. When gently heated the 2,4,6-tri-t-butylphenoxy radical is regenerated from this compound. Other free radicals that I may use may be any of the known free radicals which are capable of generating the aryloxy radical, as evidenced by discharge of their color when added to the reaction mixture.

The aryloxy radicals may likewise be generated in situ by use of peroxides. The particular peroxides chosen should be one which will decompose at the particular temperature that is to be used, in carrying out the equilibration reaction. Because it is readily available and satisfactory for my process, I generally use benzoyl peroxide, t-butyl perbenzoate, etc., if the aryloxy radical is to be generated with a peroxide. However, other peroxides having suitable decomposition temperatures can be used if desired.

Likewise, the aryloxy radicals may be generated by irradiating the reaction mixture in the presence of oxygen with actinic light. The effectiveness of the actinic light is dependent upon its being absorbed by the phenol. Generally, phenols absorb most strongly in the ultraviolet region. However, due to the low quantum yield, the irradiation must be continued during the entire equilibration reaction, whereas initiation by the use of other materials capable of generating aryloxy radicals need only to be done at the start of the equilibration reaction. For these reasons, I prefer to use means other than the irradiation with actinic irradiation, as a means for generating the aryloxy radicals. However, it can be used if desired.

Aryloxy radicals may also be generated by use of diphenoquinones which are readily prepared by the oxidative coupling of the corresponding phenol, for example, as disclosed in U.S. 3,210,384—Hay. The particular diphenoquinones that are especially useful in generating aryloxy radicals are those 3,3′,5,5′-tetra-substituted diphenoquinones wherein the substituents are either alkyl groups free of an aliphatic, tertiary α-carbon atom or aryl. When the alkyl groups contain an aliphatic, tertiary α-carbon atom, the substituents are so large and bulky that they greatly decrease, if not prevent, the quinone group from generating the aryloxy radical. Other materials which I have found useful to generate the aryloxy radical are the dipyridyl complex of cupric salts, preferably used in the absence of excess pyridine, the compound known as "methanol green" having the empirical formula

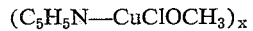

and the dipyridyl complex of cupric trichlorphenoate. The latter two compounds and method of making are described in J. Polymer Science, 58, 469–490 (1962), and are covered by copending applications of Blanchard and Finkbeiner Ser. No. 524,995, filed Dec. 22, 1964 and now Patent No. 3,277,095 and Ser. No. 510,415, filed Sept. 2, 1965 and now Patent No. 3,310,562, as divisions of prior applications and both assigned to the same assignee as the present invention.

When the tetra-substituted diphenoquinones are used for generating the aryloxy radicals, a secondary beneficial effect is obtained by their use which is not noticed when the other methods discussed above are used for generating the aryloxy initiator. This effect is noticed when polyphenylene ethers are used in the equilibration reaction which have intrinsic viscosities greater than about 0.4 and especially those having intrinsic viscosities greater than 0.6 measured in chloroform at 25° C.

During the initial polymerization reaction for making of the polyphenylene ethers, the reaction appears to be a straightforward formation of a linear polymer with an OH terminal group on one end of the polymer molecule, as would be expected. During the latter stage of the oxidative coupling polymerization reaction, apparently some of the polymer molecules, but not all, lose this terminal hydroxy group in some, as yet unknown, termination reaction. Those polymer molecules which are terminated with a hydroxyl group readily enter into equilibration with the phenols in the presence of the phenoxy radical initiator, whereas the other polymeric molecules, which are not so terminated, apparently do not. Since the presence of an OH group would be necessary to form the phenoxy radical of the polymers, this indicates that such formation is part of the overall equilibration reaction.

The diphenoquinones have the ability to react with such polymer molecules in some fashion to convert at least part of the molecule to a form which also readily equilibrates with the phenol. I have determined that the diphenoquinones in the absence of any of the phenol reactants, decrease the molecular weight of the polymer as shown by a decrease in intrinsic viscosity of the polymer. Therefore, by using diphenoquinones to produce the phenoxy radical, a higher yield of phenoxyphenol products and a lower yield of residual polymer will be obtained when the higher molecular weight polyphenylene ethers are used as the starting material in the equilibration reaction.

As a corollary to this, when a complete conversion of the polyphenylene ether to the phenoxyphenol products is desired, I prefer to use as a starting polyphenylene ether, for the equilibration reaction, those polyphenylene ethers which have intrinsic viscosities in the range of 0.05 to 0.3, and preferably, in the range of 0.1 to 0.2. By using such polyphenylene ethers, a complete conversion of the polymer to phenoxyphenol products can be obtained during the equilibration reaction regardless of what initiator is used to produce the aryloxy radicals.

In producing aryloxy radical by whatever means, i.e., the use of peroxides, use of diphenoquinones, or use of stable free radicals, the degree of equilibration which will be obtained generally is dependent upon the amount and type of initiator used to produce the aryloxy radicals. To obtain a high yield of phenoxyphenol products, the amount of aryloxy radical should be generally in the range of 1 to 10 mole percent of the amount of phenol used. No benefit is obtained by use of a larger quantity, whereas the use of a lower amount has the effect of increasing the time needed to produce a given amount of equilibration between the phenol and the polyphenylene ethers. However, lower or higher amounts may be used if desired.

Likewise, the amount of the equilibration that is obtained will be dependent upon the ratio of the moles of phenol used per mole of polymer units in the poly-(2,6-dimethyl-1,4-phenylene ether), i.e., if the phenol used is 4-bromophenol whose molecular weight is 173, then 173 g. of 4-bromophenol and 120 g. of poly-(2,6-dimethyl-1,4-phenylene ether) regardless of the actual molecular weight of the polymer, will represent an equal mole of 3-bromophenol and 1 mole of 2,6-dimethylphenylene polymer units.

Since the objective in carrying out the equilibration reaction is to produce a large yield of the phenoxyphenol product, the ratio of the phenol to poly-(2,6-dimethyl-1,4-phenylene ether) should be at least one mole of phenol per mole of polymer unit in the polymer molecule and preferably, greater than one mole.

The progress of the reaction is easily ascertained by withdrawing a small sample, precipitating any polymer present by pouring into methanol and thereafter silylating the filtrate and determining its composition by gas chromatography. When two consecutive chromatographs are the same then the maximum amount of aquilibration has been obtained. In some cases, the addition of more initiator for the aryloxy radical, may cause further equilibration of the reaction mixture, especially if some impurity was present which may have stopped the equilibration reaction before true equilibrium was established.

After the desired degree of equilibration has been attained, isolation of the phenoxyphenol products is facilitated by extracting as much phenol present in the reaction mixture as possible by extracting the reaction mixture with aqueous alkali, e.g., sodium or potassium hydroxide, etc., followed by acid and water wash. This is not necessary but it does reduce the amount of silylating agent required to stabilize the reaction mixture for isolating the individual phenoxyphenol products. If the reaction mixture contains a polymer, as determined by a previous run, or by test on a sample, the reaction mixture is mixed with a liquid which is a non-solvent for the polymer but is a solvent for the phenoxyphenol. The lower alkyl alcohols, e.g., methyl, ethyl, propyl, butyl, hexyl, octyl, etc., alcohols are ideal precipitating liquids with methyl and ethanol alcohol being preferred because of their low cost and availability and excellent precipitating properties.

Enough of the precipitating liquid is added to overcome the ability of the solvent in the reaction mixture to retain any high molecular weight polymer in solution. The precipitating liquid can be added to the reaction mixture or vice versa. Generally a volume of precipitating liquid which is two to three times the volume of the reaction mixture is sufficient. To reduce the amount of precipitating liquid required, the volume of the reaction mixture can be reduced by evaporation of some of the solvent either by distillation at the end of the equilibration reaction, especially if carried out at the reflux temperature, or under reduced pressure sufficient to cause the solvent to distill, if a lower distillation temperature is desired.

If the concentration step follows the alkali extraction step, it is preferable that the concentration step be performed at or below ambient temperature, if it is desired to suppress further equilibration in the reaction mixture. Further equilibration will produce some of the starting phenol due to interaction of the phenoxyphenols and higher oligomers present in the reaction mixture which further upsets the previously established equilibrium due to the change in phenoxyphenol concentration, etc.

To suppress this shifting of the equilibrium during isolation of the phenoxyphenol products, the phenoxyphenols are converted to silyl ethers which prevents further change in the make-up of the equilibrium mixture. The solution of the silyl ethers so produced can be distilled to isolate the individual components. Since the silyl ethers are readily hydrolyzed at room temperature with water containing a trace of mineral acid, to regenerate the phenoxyphenol, they are a convenient intermediate to permit isolation of the phenoxyphenol products.

The silylating agent is preferably monofunctional, i.e., the silyl group has only one group which is replaced during the silylating reaction. Typical examples are the trialkylsilyl halides, triarylsilyl halides, dialkyl arylsilyl halides, alkyl diarylsilyl halides, and compounds having the formula:

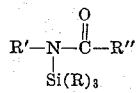

where R', R" and R are monovalent hydrocarbon radicals, R' is in addition hydrogen and the —Si(R)₃ radical and R" in addition is hydrogen and the

radical, where Z is selected from the class consisting of hydrogen, monovalent hydrocarbon radicals, and the aforesaid —Si(R)₃ group, with R having the meaning above, and thereafter obtaining a compound whose acidic proton (hydrogen) is substituted with a —Si(R)₃ group.

Among the monovalent hydrocarbon radicals which R, R', R" and Z in Formula I may be, are for instance, alkyl radicals (e.g., methyl, ethyl, propyl, isopropyl, pentyl, octyl, dodecyl, etc., radicals); alkenyl radicals (e.g., vinyl, allyl, crotyl, etc., radicals); aryl radicals (e.g., phenyl, naphthyl, biphenyl, etc., radicals); aralkyl radicals (e.g., benzyl, phenylethyl, etc., radicals); alkaryl radicals (e.g., xylyl, tolyl, ethylphenyl, methylnaphthyl, etc., radicals); cycloaliphatic (including unsaturated) radicals (e.g., cyclopentyl, cyclohexyl, cyclopentenyl, cyclohexenyl, etc., radicals); etc.

The preparation and use of these compounds as silylating agents are disclosed and claimed in an application of Klebe, Ser. No. 398,781, filed Sept. 23, 1964 and assigned to the same assignee as the present invention.

Bifunctional silylating agents can be used but would produce compounds having higher boiling points which would increase the temperature required for distillation. Since the silyl ethers are so easily hydrolyzed, the only object in preparing them would be to permit isolation of the individual phenoxyphenol products. Therefore, I prefer to use the monofunctional silylating agents. Furthermore, because the aryl and higher alkyl silylating agents would also have higher boiling points than the trimethylsilyl ether, I prefer to use a monofunctional silylating agent in which the silyl group is the trimethylsilyl group, e.g., trimethylsilyl halides, i.e., chloride, bromide, iodide, etc., and compounds wherein R in the above formula is methyl, e.g., N,N-bis(trimethylsilyl)formamide, N,N-bis (trimethylsilyl)acetamide, etc.

In order that those skilled in the art may better understand my invention, the following examples are given which are illustrative of the practice of my invention and are not intended for purposes of limitation. In the examples, all percents are by weight unless otherwise stated. The intrinsic viscosities are given as dec. l./g., measured in chloroform at 25° C. Where elemental analyses are given, the determined values are followed by the theoretical values in parentheses.

Example 1

This example illustrates the preparation of 4-(4-bromophenoxy) - 2,6 - dimethylphenol and 4[4-(4-bromophenoxy)2,6-dimethylphenoxy]-2,6-dimethylphenol. A solution of 100 g. of poly-(2,6-dimethyl-1,4-phenylene ether) having an intrinsic viscosity of 0.34, 144 g. of p-bromophenol and 10 g. of benzoyl peroxide in 2.1 of benzene was heated to reflux for 2 hours. At the end of this time, 223 g. of bis(trimethylsilyl)acetamide (90% pure) was added and heating continued at reflux for an additional 1 hour. At the end of this time, the reaction mixture was cooled and concentrated to approximately 700 ml. at room temperature under vacuum on a rotary evaporator. The concentrated solution was distilled with the distillate of the trimethylsilyl ether of 4-bromophenol being discarded. The balance of the distillate was again carefully redistilled collecting the fractions shown in Table I.

TABLE I

| Fraction | B.P., °C. 0.03 mm. Hg | Wt., g. | Formula of Product |
|---|---|---|---|
| A | 120 | 37 | 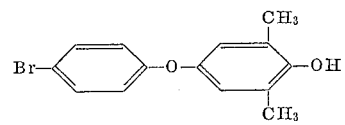 |
| B | 150 | 17 | 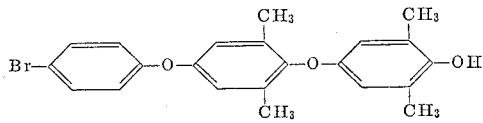 |

Analysis of Fraction B showed the following results: C, 61.9 (62.0); H, 5.9 (6.0); Br, 16.6 (16.5); mol wt., 475 (485).

The proton magnetic resonance spectra (PMR) of these two fractions were determined on deutrochloroform solutions at 60 megacycles using tetramethylsilane as internal standard. The peak location is reported in cycles per second (c.p.s.) and is the amount of shift from the internal standard. Relative values (R.V.) are the ratios obtained by dividing the total area under each peak by the total area corresponding to a single proton.

FRACTION A

| C.p.s. | R.V. | Interpretation (m.e.=magnetically equivalent) |
|---|---|---|
| 15 | 9 | 9 m.e. methylsilyl protons (1 m.e. trimethylsilyl group). |
| 129.5 | 6 | 6 m.e. aliphatic protons (2 m.e. $CH_3$—on aromatic ring). |
| 398 | 2 | 2 m.e. aryl protons. |
| 402 | | |
| 411 | 4 | 2 pairs of m.e. aryl protons on the bromophenyl ring interacting to form $A_2B_2$ pattern. |
| 436 | | |
| 44.5 | | |

FRACTION B

| C.p.s. | R.V. | Interpretation |
|---|---|---|
| 14 | 9 | 9 m.e. methylsilyl protons (1 m.e. trimethylsilyl group). |
| 125.5 | 6 | 6 m.e. aliphatic protons (2 m.e. $CH_3$—on aromatic ring). |
| 128 | 6 | Do. |
| 382 | 2 | 2 m.e. aryl protons. |
| 403 | 2 | Do. |
| 408 | | |
| 417.5 | | |
| 440 | 4 | 2 pairs m.e. aryl protons on the bromophenyl ring interacting to form an $A_2B_2$ pattern. |
| 449 | | |

The trimethylsilyl group was removed from these two fractions to convert them to the corresponding phenols, 4-(4-bromophenoxy)-2,6-dimethylphenol and 4[4-(4-bromophenoxy)-2,6-dimethylphenoxy]-2,6-dimethylphenol, by dissolving 2 g. each of the trimethylsilyl ethers in 50 ml. of methanol at room temperature and adding 1 drop of concentration aqueous hydrochloric acid and sufficient water (ca. 20 ml.) to reach the cloud point. Upon cooling to 0° C., the free phenolic compound crystallized from solution and was removed by filtration. The precipitate was washed with cold aqueous methanol and dried at room temperature under reduced pressure. Additional water was added to the filtrates to obtain additional crystals of the free phenolic materials. The 4-(4-bromophenoxy)-2,6-dimethylphenol had a melting point of 62.5–63.5° C. and the 4-[4-(4-bromophenoxy)-2,6-dimethylphenoxy]-2,6-dimethylphenol had a melting point of 100–102° C. Elemental analyses and PMR spectra showed that these compounds, (I) from hydrolysis of fraction A and II from hydrolysis of fraction B have the structural formulae:

I
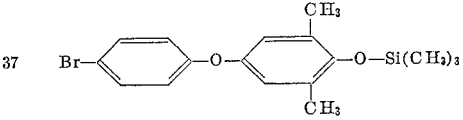

II
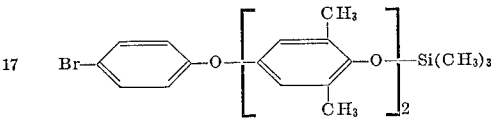

| Analyses | Found (thero.) | |
|---|---|---|
| | I | II |
| C | 57.4 (53.0) | 63.7 (63.8) |
| H | 4.5 (4.5) | 5.1 (5.1) |
| Br | 27.2 (26.4) | 18.5 (19.3) |
| Mol. Wt | 285 (293) | 392 (413) |

PMR spectra were obtained on solutions in deutrodimethylsulfoxide [$(CD_3)_2SO$], tetramethylsilane, internal standard.

COMPOUND

| C.p.s. | R.V. | Interpretation |
|---|---|---|
| 132 | 6 | 6 m.e. aliphatic protons (2 m.e. $CH_3$—on an aromatic ring). |
| 270 | 1 | 1 hydroxylic proton. |
| 399 | 2 | 2 m.e. aryl protons-phenol ring. |
| 402 | | |
| 411 | 4 | 2 pairs of m.e. aryl protons on bromophenyl ring interacting to produce an $A_2B_2$ pattern. |
| 436 | | |
| 445 | | |

COMPOUND 2

| C.p.s. | R.V. | Interpretation |
|---|---|---|
| 122 | 6 | 6 m.e. aliphatic protons (2 m.e. $CH_3$—on an aromatic ring). |
| 125 | 6 | Do. |
| 200 | 1 | 1 hydroxylic proton. |
| 380 | 2 | 2 m.e. aryl protons. |
| 410 | 2 | Do. |
| 414 | | |
| 425 | | |
| 448 | 4 | 2 pairs of m.e. aryl protons on bromophenyl ring interacting to produce an $A_2B_2$ pattern. |
| 457 | | |

*Example 2*

This example illustrates the preparation of 4-[4-hydroxy-3,5-dimethylphenyl)-2,6-dimethylphenoxy]-2,6-dimethylphenol. A mixture of 100 g. of 3,3',5,5'-tetramethyl-4,4'-biphenol, 15 g. of 3,3',5,5'-tetramethyl-4,4'-diphenoquinone and 2 l. of benzene was heated to 80° C. To this mixture was added 50 g. of poly-(2,6-dimethyl-1,4-phenylene ether) having intrinsic viscosity of 0.27. After heating for 16 hours at reflux gas chromatographic analysis indicated the presence of 30 g. of the desired phenoxyphenol product. At this point 204 g. of bis(trimethylsilyl)acetamide, (90% pure) was added dropwise. After 2 hours of heating at reflux, the mixture was concentrated and distilled at reduced pressure as described in Example 1. After distilling the silyl ether of the starting biphenol, there was obtained 40 g. of the bis(trimethylsilyl) ether of 4-[4-(4-hydroxy-3,5-dimethylphenyl)-2,6-dimethylphenoxy]-2,6-dimethylphenol, boiling at 190° C. at 0.01 mm./Hg. This product has the formula:

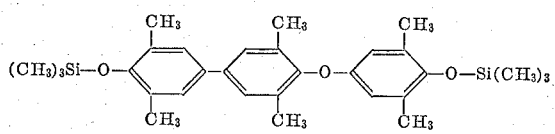

Hydrolysis of this fraction, as described in Example 1, yielded the free phenolic product as a crystalline solid having a melting point of 201.5–202.5° C. Infrared and PMR spectra as well as elemental analysis and gas chromatography confirmed that this product had the structural formula:

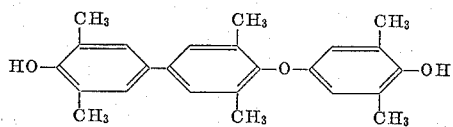

*Analysis.*—C, 79.3 (79.6); H, 7.3 (7.2); mol. wt., 359 (362).

The PMR spectrum of a solution in deutrochloroform (tetramethylsilane, internal standard) showed:

| C.p.s. | R.V. | Interpretation |
|---|---|---|
| 123 | 12 | 12 m.e. aliphatic protons (4 $CH_3$—on the biphenyl ring). |
| 132 | 6 | 6 m.e. aliphatic protons (2 $CH_3$—on the phenol ring). |
| 376 | 2 | 2 m.e. aryl protons. |
| 429 | 2 | Do. |
| 435 | 2 | Do. |
| 462 | 1 | 1 hydroxylic proton. |
| 491 | 1 | Do. |

Example 3

This example illustrates the preparation of 4-[4-(4-hydroxyphenylisopropylidene)phenoxy] - 2,6 - dimethylphenol. A solution of 40 g. of 4,4'-isopropylidenediphenol, 20 g. of poly-(2,6-dimethyl-1,4-phenylene ether), intrinsic viscosity 0.11 and 0.6 g. of 3,3',5,5'-tetramethyl-4,4'-diphenoquinone in 600 ml. of benzene was heated for two hours at 80° C. At the end of this time, 64 g. of bis(trimethylsilyl)acetamide (90% pure) was added. Heating at 80° C. was continued for one hour. The mixture was concentrated and distilled under reduced pressure as described in Example 1. After collecting 46 g. of the bis(trimethylsilyl) ether of 4,4'-isopropylidenediphenol, boiling point 130° C. at 0.01 mm. Hg pressure, there was obtained 22 g. of the bis(trimethylsilyl) ether of the desired product boiling at 212° C. at 0.01 mm. Hg pressure. Elemental analysis and the PMR spectrum showed that this product had the structural formula:

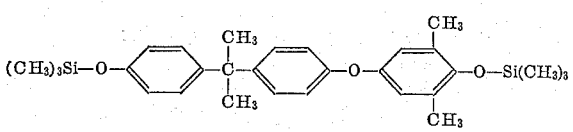

*Analysis.*—C, 70.7 (70.7); H, 8.2 (8.1).

The PMR spectrum of a solution in carbon tetrachloride (tetramethylsilane, internal standard) showed:

| C.p.s. | R.V. | Interpretation |
|---|---|---|
| 14 | 18 | 18 aliphatic protons ($CH_3$—on 2 silicon atoms, i.e., two trimethylsilyl groups). |
| 97 | 6 | 6 m.e. aliphatic protons (2 $CH_3$—on an aromatic ring). |
| 129 | 6 | Do. |
| 395 | 2 | 1 pair m.e. aryl protons. |
| 392, 399, 401 | | 1 set of 2 pairs of m.e. aryl protons interacting to produce an $A_2B_2$ pattern. |
| 408, 417, 420, 426, 429 | 8 | 1 set of 2 pairs of m.e. aryl protons interacting to produce an $A_2B_2$ pattern. |

The trimethylsilyl groups were removed by dissolving one g. of the above bis(trimethylsilyl) ether in 25 ml. of methanol and adding one drop of concentrated aqueous HCl. The solution was evaporated to dryness at ambient temperature under reduced pressure. The crystals so obtained were recrystallized from a benzene-hexane solution to obtain a product melting at 118–119° C. Elemental analysis and the PMR spectrum showed that this material had the structural formula:

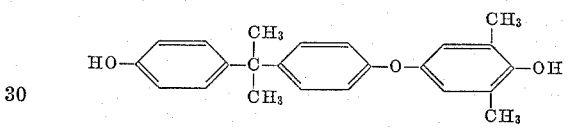

*Analysis.*—C, 79.2 (79.3); H, 6.0 (6.9); mol. wt. 337 (348).

The PMR spectrum of a solution in deutrochloroform (tetramethylsilane, internal standard) showed:

| C.p.s. | R.V. | Interpretation |
|---|---|---|
| 97 | 6 | 6 m.e. aliphatic protons (2 m.e. $CH_3$—on aliphatic carbon). |
| 131 | 6 | 6 m.e. aliphatic protons (2 m.e. $CH_3$—on aromatic ring). |
| 280 | 1 | 1 m.e. hydroxylic proton. |
| 312 | 1 | Do. |
| 397, 401[1], 404 | | 1 set of 2 pairs of m.e. aryl protons interacting to produce an $A_2B_2$ pattern. |
| 406, 413, 421, 423 | 10 | 1 set of 2 pairs of m.e. aryl protons interacting to produce an $A_2B_2$ pattern. |
| 430, 432 | | 1 pair of m.e. aryl protons. |

[1] In view of PMR spectra of the bis(trimethylsilyl) ether this value is probably that of the 1 pair of m.e. aryl protons which do not interact to produce an $A_2B_2$ pattern.

The phenoxyphenols have a wide variety of uses. They may be esterified with monobasic or dibasic acids, anhydrides or acyl halides to produce esters which are useful as plasticizers. The two phenoxyphenol products, having bromine in the p-position, may be converted into chemical derivatives such as thyroxine analogs in which the terminal or bromine group is reacted with, for example, lithium or magnesium to form Grignard reagents which can thereafter be reacted to produce the desired derivatives. These compounds can likewise be polymerized, for example, in alkaline potassium ferricyanide solutions to polyphenylene ethers or used as modifiers with other phenols in the preparation of polyphenylene ethers.

The phenoxyphenols containing two hydroxyl groups can be used as antioxidants for petroleum products such as cracked gasoline, or they may be used for producing resins, e.g., epoxy resins, polyesters, polycarbonates, etc. The following discussion is illustrative of how resins, for example, polyesters, polycarbonates, epoxy resins, etc. may be made from the novel dihydric phenols of this invention.

In the preparation of polycarbonate resins, 1 mole of the dihydric phenol is reacted with 1 mole of a carbonate precursor, for example, phosgene, diphenyl carbonate or the bis-haloformate formed by reacting 1 mole of the dihydric phenol with 2 moles of phosgene. Usually, in carrying out these reactions a slight excess of the carbonate precursor is used to insure complete reaction in the ratio of 1 mole of the phenol to 1 to 2 moles of the carbonate precursor. The reaction is usually carried out in an inert solvent in the presence of a hydrogen halide acceptor such as a tertiary amine, a metallic base such as a metallic hydroxide or carbonate. In some cases, it is desirable to carry out the reaction in the presence of a compound which acts as both a hydrogen halide acceptor and a solvent, for example, pyridine. The reaction proceeds readily at room temperature, although it may be hastened by heating. After sampling of the resinous solution to insure that the desired degree of polymerization has been obtained, preferably an intrinsic viscosity of at least 0.4, the polymer is precipitated by adding a non-solvent and removed by filtration. More specific details are to be found, for example, in U.S. Patent 2,950,266—Goldblum, issued Aug. 23, 1960; U.S. Patent 2,999,835—Goldberg, issued Sept. 12, 1961; or U.S. Patent 3,028,365—Schnell et al., issued Apr. 3, 1962.

Polyesters of aromatic dicarboxylic acids may be made, for example, by an adaptation of the method disclosed in U.S. 3,036,990—Kantor et al., issued May 29, 1962, wherein one mole of a dicarboxylic acid, e.g., isophthalic, terephthalic, azelaic acids, etc., in the form of their acyl halides is reacted with one mole of the dihydric phenol in the presence of a solvent for both the reactants and the polymer until no more hydrogen halide is evolved. Particularly useful solvents, especially when the acyl halide is an aromatic diacyl halide, are the commercially available mixtures of halogenated diphenyls or halogenated diphenyl oxides, since these are good solvents and permit the reaction to be carried out at elevated temperatures in reasonable lengths of time, and permit the polyesters to be obtained with intrinsic viscosities of at least 0.4

Esterification can also be carried out using interfacial techniques wherein the dicarboxylic acid in the form of its acyl chloride is dissolved in an organic solvent and the dihydric phenol is dissolved or emulsified in water in the form of its alkali metal salt. The solution is gradually mixed by slowly adding one of the solutions to the other. The reaction is usually carried out at room temperature, as described in more detail in U.S. Patent 3,028,364—Conix et al., issued Apr. 3, 1962. Furthermore, the polyesters of the dihydric phenol containing both carboxylic acid and carbonate groups may be made as described in U.S. Patent 3,030,331—Goldberg, issued Apr. 17, 1962, wherein both an aromatic dicarboxylic acid in the form of its acyl halide and a carbonate precursor such as phosgene are reacted simultaneously with the dihydric phenol.

Copolymers may be made where two or more polycarboxylic acids are reacted with one or more of the dihydric phenols with or without other polyhydroxy compounds to produce copolymers of interesting properties.

Polyesters may be prepared by an ester interchange reaction wherein the dihydric phenol is first reacted with a lower monocarboxylic acid, usually in the form of the acyl halide or anhydride, for example, acetyl chloride or acetic anhydride, to give the diacetate ester which is then reacted with an aromatic dicarboxylic acid, for example, phthalic acid, terephthalic acid, isophthalic acid, etc., usually in a solvent which is a solvent for both the reactants and the polyester at an elevated temperature whereby acetic acid is expelled from the reaction mixture, for example, as described in U.S. Patent 2,595,343—Drewitt et al., issued May 6, 1952. If this method is to be used to make polyesters from the dihydric phenols of this invention, then in place of making the silyl ethers in the isolation of the dihydric phenols from the reaction mixture, acetic anhydride or an acetyl halide may be used to form the diacetate ester and thereafter distillation carried out as it is done for the silyl ethers. In this way the diacetate ester is prepared directly and may be used in this reaction in forming the polyesters by ester interchange reaction. The diacetate esters are reacted with the aromatic dicarboxylic acids such as the phthalic acids, listed above, using an inert solvent such as for example, the chlorinated diphenyls or chlorinated diphenyl oxide, the heating being continued until no more acetic acid is expelled from the solution. In a similar way, aliphatic dicarboxylic acids, e.g., sebacic acid, azelaic acid, etc., may be substituted for part or all of the aromatic dicarboxylic acid.

Epoxy resins may be made by reacting one mole of the dihydric phenol with two or more moles of an epichlorohydrin, depending on whether a liquid or solid epoxy resin is desired, the larger amounts giving the more fluid resins. Any excess epichlorohydrin acts as a solvent and is recovered from the polymer mixture. The reaction is generally carried out by heating at from 100° C. up to the reflux temperature with the slow addition of caustic to act as a hydrogen halide acceptor reacting with the hydrochloric acid involved and to maintain the reaction mixture approximately neutral. The glycidyl polyether intermediate may be further reacted with other compounds containing active hydrogen, e.g., other mono- or polyhydric phenols, phenol-aldehyde resins, mono- and polyhydric alcohols, amines, amides, ureas, urea-aldehyde resins, melamine, melamine-aldehyde resins, etc., to produce modified polymers. Such modifiers may be reacted as a separate step or along with the curing step when the epoxy resin is cured with a polycarboxylic acid. Other modifications and details are found, for example, in "Epoxy Resins," by Lee and Neville, McGraw-Hill Book Co., Inc., New York, 1957.

Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. The chemical compounds having the formula

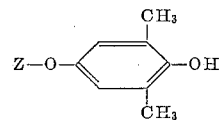

where Z is

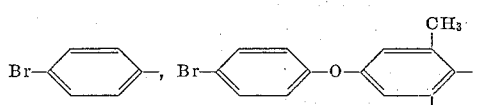

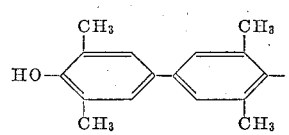

and

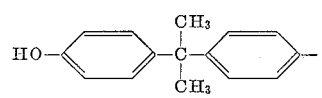

2. The compound of claim 1 wherein Z is

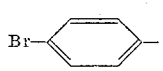

3. The compound of claim 1 wherein Z is
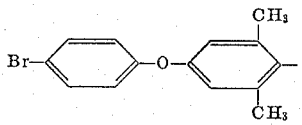
4. The compound of claim 1 wherein Z is
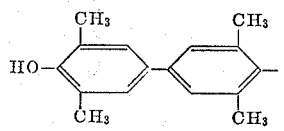
5. The compound of claim 1 wherein Z is
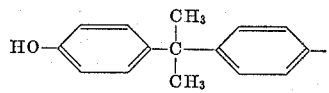
References Cited
UNITED STATES PATENTS
3,134,753  5/1964  Kwiatek.
3,220,979  11/1965 McNelis.
3,306,875  2/1967  Hay.
BERNARD HELFIN, *Primary Examiner.*